United States Patent [19]

Solomon

[11] 4,448,813
[45] May 15, 1984

[54] PREPARATION OF CORD FOR BONDING TO RUBBER

[75] Inventor: Thomas S. Solomon, Brecksville, Ohio

[73] Assignee: The B. F. Goodrich Company, Akron, Ohio

[21] Appl. No.: 420,548

[22] Filed: Sep. 20, 1982

[51] Int. Cl.³ .................. B05D 3/02; B05D 1/18; C09J 3/12
[52] U.S. Cl. .................. 427/381; 156/330.9; 156/331.4; 156/910; 427/389.9; 427/430.1; 524/521; 524/522
[58] Field of Search ............ 156/110 A, 330.9, 331.4; 427/389.9, 430.1, 381; 524/521, 2

[56] References Cited

U.S. PATENT DOCUMENTS

| | | | |
|---|---|---|---|
| 3,460,973 | 8/1969 | Hantzer et al. | 156/110 X |
| 3,861,980 | 1/1975 | Wise | 156/110 X |
| 4,300,615 | 11/1981 | Kauchock | 156/110 X |
| 4,331,738 | 5/1982 | Kuan | 524/521 X |

*Primary Examiner*—Michael R. Lusignan
*Attorney, Agent, or Firm*—Alfred D. Lobo; Michael J. Colitz, Jr.; H. F. Pepper, Jr.

[57] ABSTRACT

An adhesive activated (AA) polyester cord, aramid cord, and fabrics made therefrom, may be coated in a one-step dip comprising an aqueous dispersion of a solid finely divided reversibly blocked polyisocyanate (RBP), an adhesive latex of a diene polymer, and a dispersion of an acrylic resin selected from the group consisting of a homopolymer of a monomer, or a copolymer of two or more monomers having the structure

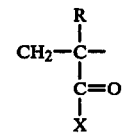

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms. Automobile tires made from fabric coated with the one-step combination R/F/L, acrylic resin and RBP dip have comparable of better properties, as evidenced by test results of tires tested to destruction, than those of tires made with fabric treated with a two-step bath, the first bath containing the RBP and the second bath containing the R/F/L and acrylic resin. The one-step coating process is ineffective with polyester cord or fabric which is not adhesive activated.

13 Claims, No Drawings

PREPARATION OF CORD FOR BONDING TO RUBBER

BACKGROUND OF THE INVENTION

The majority of rubber goods in which high tensile strength is required are reinforced with reinforcing elements (referred to herein as "cords" for simplicity) made from a variety of filamentary textile materials, such as rayon, nylon, aramid or polyester fibers. Polyester and aramid cords are frequently preferred because of their high strength and high modulus which are particularly advantageous in goods such as tires, hose and belts, but it has been found far more difficult to achieve adhesive bond strengths between polyester and rubber, or aramid and rubber, than between nylon and rubber. Rayon and nylon are treated satisfactorily with a single step (single bath) coating of an aqueous dispersion of a resorcinol formaldehyde latex (R/F/L).

The difficulty in bonding polyester cord to rubber is generally attributed to the presence of only hydroxyl (OH) and carboxyl (COOH) groups at the ends of the polyester molecules, while in nylon (for example) there is a relatively high frequency of amide (CONH) groups along the macromolecular chain. Aramid fibers are a special case which are not as satisfactorily coated as nylon, having instead, the adhesive characteristics of a polyester cord. Therefore, therefore, this invention is directed to polyester and aramid cords, and most particularly to adhesive-activated (AA) polyester cord.

Many adhesives and bonding systems ("dips") for synthetic linear polyester cords have been used. Most are cost-ineffective and additionally suffer from various other disadvantages such as toxicity in the case of of adhesives based on glycidyl ethers, or water-soluble phenolic condensates; and/or instability as in the case of polyisocyanates, which has resulted in the use of water-insoluble reversibly blocked polyisocyanates (RBP) which, generally being solid, tend to precipitate in the baths in which the cord is dip-coated. An RBP is so termed because the reactive isocyanate (NCO) group is blocked against reaction at low temperature below about 400° F., and then the isocyanate is regenerated when the temperature is raised, usually above 400° F. but below about 500° F. The temperature at which a RBP will dissociate depends mostly on the blocking moiety (or substituting group).

The treatments which utilize phenol-blocked methylene-bis-(4-phenylisocyanate), and the like are disclosed in U.S. Pat. No. 3,307,966, and the use of phenol-aldehyde blocked polyisocyanates are disclosed in U.S. Pat. No. 3,226,276, inter alia. These treatments using an RBP necessarily require the use of plural baths, or the adhesion is unacceptable.

In a typical commercial process, polyester cord is dipped in a RBP bath in which solid finely ground RBP is dispersed with the aid of a dispersing agent, excess RBP removed, the RBP-coated cord dried at about 300° F., then the dried cord is heat-set at a temperature below about 500° F. In the second bath, heat-set RBP-coated cord is dipped in an R/F/L, excess R/F/L is removed, dried at about 300° F., and heat-set at a temperature below about 500° F. so as to give excellent adhesion of the R/F/L to the RBP-coated cord.

Though cord which has been properly coated with a two-step RBP, then R/F/L coating, has excellent adhesion to rubber if it is immediately embedded in it, and cured (the rubber is vulcanized), the adhesion is poorer if the pretreated cord is exposed to the atmosphere and/or to sunlight. To combat this problem, I have disclosed in U.S. Pat. No. 3,968,295, the coating of an RBP-coated cord with a R/F/L in which is mixed an acrylic resin (interpolymer) such as is disclosed in U.S. Pat. No. 3,007,887, the disclosure of which is incorporated by reference thereto as if fully set forth herein. This interpolymer (copolymer) negates the degrading effects of the atmosphere and sunlight on the pretreated cords, serving an "anti-degradative" function in the R/F/L dip without adversely affecting the cords' excellent adhesion to cured rubber.

By "excellent adhesion" I infer that, in a standard "H-pull" test, the pulled out cord is coated with rubber. In fact, as the data in my '295 patent indicates, the pull-out force for cord treated in a two-step process, first with RBP, then with R/F/L in which is mixed the carboxylic acid ester copolymer, is essentially the same as that of rubber in which the same R/F/L dip is used without the copolymer. Since the acrylic resin exhibited no improvement in adhesion initially, I had no reason to expect that this acrylic resin might have a unique effect, on a molecular scale, if the RBP-coating bath and the R/F/L coating bath were combined. Stated differently, it was surprising that the acrylic resin acted as an adhesion promoter if the RBP and R/F/L baths were combined.

In the prior art, to save on the costs of a two-step process, numerous one-step (single-dip) processes have been suggested, but few proved usable. A widely used single-dip process is disclosed in U.S. Pat. No. 3,660,202 in which a water-soluble phenol is combined with a R/F/L. However, when a RBP is combined with a R/F/L and the cord coated in such a single bath, the adhesion of the coated cord in rubber is unacceptable. This is attributed to the effect, on a molecular scale, of the RBP which interferes with the adhesion of the R/F/L. By coating the RBP in a first step, and the R/F/L in a second step, the R/F/L effectively sheaths the RBP-coated cord, thus negating the effect of the RBP at the rubber-R/F/L interface; which is the reason for the two-step process. I know of no single-dip adhesive composition for coating a polyester cord which bath combines a solid RBP and a R/F/L, and has been successfully used commercially.

To avoid the operating inconveniences of a two-step process such as solid RBP settling out in the first bath, contamination of the second bath, and the like, and in addition, to save on operating costs, it is desirable to provide a one-step process for coating polyester and aramid cord with a combination of the RBP and the R/F/L in a single bath without deleteriously affecting the properties of the coated and heat-set cord, and without destroying the useful life of the bath. This invention does so.

SUMMARY OF THE INVENTION

It has been discovered that adhesive activated (AA) polyester cord, aramid cord, and fabrics made therefrom, may be coated in a one-step dip comprising an aqueous dispersion of a solid finely divided reversibly blocked polyisocyanate (RBP), an adhesive latex of a diene polymer, and a dispersion of an acrylic resin selected from the group consisting of a homopolymer of a monomer, or a copolymer of two or more monomers having the configuration

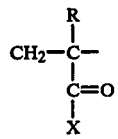

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms.

It has more specifically been discovered that at least one particular polymer (referred to hereinafter as an "acrylic resin"), selected from the group consisting of poly[(meth)acrylic acids], poly[N-methylol (meth)acrylamides], and a copolymer of one or more monomers of the foregoing homopolymers with a lower (meth)acrylic acid ester, functions as an adhesion promoter in a bath containing a finely ground solid RBP, which bath is used to pretreat (coat) a cord or fabric made of AA polyester, or an aramid, in a one-step coating process without adversely affecting the adhesion of the cord or fabric when cured in rubber, compared to the adhesion of the cord or fabric when it is coated with an RBP in a first step, and an adhesive latex of a diene polymer containing an acrylic copolymer in a second step.

It is therefore a general object of this invention to provide a bath composition ("one-step dip") for coating a cord or fabric made from AA polyester or aramid with a RBP and a R/F/L in a single step, comprising, an aqueous dispersion of a finely ground RBP and at least one polymer selected from the group consisting of poly[(meth)acrylic acids], poly(N-methylol (meth)acrylamides), and a copolymer of one or more monomers of the foregoing homopolymers with a lower (meth)acrylic acid ester.

It is also a general object of this invention to provide a one-step method for coating an AA polyester cord, or an aramid cord, with a combination RBP and R/F/L in the presence of a predetermined amount of the aforesaid acrylic resin without sacrificing the adhesion obtained in a two-step process.

It is a specific object of this invention to provide a one-step dip for coating cord or fabric made from AA polyester with an adhesive consisting essentially of an R/F/L, an acrylic resin having a mol wt in the range from about 3,000 to about 300,000, and a RBP formed by preliminarily reversibly blocking (coupling or substituting) an aromatic polyisocyanate with a compound capable of an addition reaction with it. The RBP is unblocked at a temperature above about 300° F. but below a temperature deleterious to the tensile strength of the AA polyester, or aramid cord. Quite unexpectedly, the one-step dip is ineffective with polyester cord or fabric which is not adhesive-activated, yet it is effective on commercially available aramid cord or fabric which apparently is not especially treated or activated for adhesion with R/F/L.

DETAILED DESCRIPTION OF PREFERRED EMBODIMENTS

According to a preferred aspect of this invention an adhesive-activated (AA) polyester cord, or an aramid cord, is pretreated by the process of the invention in a one-step process with a reversibly blocked polyisocyanate (RBP), a resorcinol formaldehyde (R/F) condensate, a rubber latex, and an acrylic resin.

The term "polyester" means highly homopolymeric or copolymeric linear ester derived from one or more dicarboxylic acids or ester forming derivatives thereof polycondensed with one or more glycols of the series HO(CH$_2$)$_n$OH where n is greater than 1 but not exceeding 10 and glycol ethers derived therefrom. The phrase "highly polymeric linear esters" means polyesters which may be drawn to a state of molecular orientation as shown by characteristic X-ray patterns. A preferred acid is terephthalic acid. Examples of ester-forming derivates of terephthalic acid are its aliphatic (including cycloaliphatic) and aryl esters and half-esters, its acid halides and its ammonium and amine salts. Examples of the said glycols are ethylene, trimethylene, tetramethylene, hexamethylene and decamethylene glycols. The preferred polyester for purposes of this invention is polyethylene terephthalate or a polyester comprising at least 95% by weight of polyethylene terephthalate but the process of this invention may be used with any highly linear polyester provided it is adhesive-activated (AA). By AA polyesters I refer to commercially available polyester cords available from Celanese Corp. as T-811, T-911, T-865, T-879, T-870 and D-230, referred to in a publication by J. Conrad Wease published at a meeting of the International Society of Industrial Fabric Manufacturers in Oct. 28-9, 1980, in Charlotte, N.C.

The term "aramid" means certain aromatic polyamides such as poly(p-phenylene terephthalamide), also referred to as PPD-T, and the like which are described in U.S. Pat. Nos. 3,869,429 and 3,869,430, and commercially available under the trademark Kevlar from the DuPont Company. The disclosures of the aforementioned '429 and '430 patents are incorporated by reference thereto as if fully set forth herein.

The latex component of this invention should not be considered as being limited to any specific type of natural rubber latex, but rather to include all of those comparable diene polymer latex compositions commonly employed in the rubber fabricating industry. It is preferred however, that the latex contain at least some vinyl pyridine latex. This well-known type of latex is formed from butadiene, styrene, and vinyl pyridine monomers, usually in about a 70/15/15 by weight ratio.

The R/F component of the coating composition is a water-soluble R/F resin, which resin is produced by the well-known reaction of resorcinol and formaldehyde under aqueous alkaline conditions. The amount of R/F resin which may be employed with the latex composition can be varied considerably; that is, from about 10 to about 33 parts of the resin solution to 100 parts of the latex on a solids basis, or, about 9 to 25% by weight of the latex dip solution (solids basis). The starting latex is usually diluted with water prior to the addition of the resorcinol-formaldehyde resin to provide the desired final solids content for the coating bath; that is, about 15 to 30% solids by weight. The ratio of resorcinol to formaldehyde in the resorcinol-formaldehyde resin, however, is generally maintained within narrow limits from about equimolar amounts to about 2.0 moles formaldehyde/1.0 mole resorcinol.

The RBP may be any reversibly blocked (substituted) polyisocyanate (RBP) in which the substituent contains an active hydrogen atom. Though such active H-containing compounds include water, amines, alcohols, organic acids, phenols, amides, anhydrides, halogen acids, potassium hydroxide, ammonia, sodium bisulfite, Grignard reagents, inter alia, preferred are the phenols and amides.

Any of the well-known polyisocyanates may be used in making the RBP, including triphenyl methane-triisocyanate, 2,4-toluene-diisocyanate, hexamethylene-diisocyanate, and the like. As is well known, such RBPs are particularly effective in combination with an R/F/L adhesive containing a rubber latex, when the RBP is heated to regenerate the polyisocyanate and the phenolic resin.

Preferred phenol blocking agents used to block the polyisocyanate are the monohydroxy benzenes, particularly if they are suitably substituted. Such substituted monohydroxy benzenes include o-chlorophenol, p-chlorophenol, o-bromophenol, p-bromophenol, o-cresol, p-cresol, 3,4-dichlorophenol, p-tertiary butyl phenol, and 2,5-dimethyl phenol.

More preferred blocking agents used to block the polyisocyanate, are amides, most preferred of which are lactams such as 2-pyrrolidone, 2-piperidone, caprolactam (6-amino-hexanoic acid lactam), and the like.

A lactam-blocked polyisocyanate is made by reacting a lactam with a polyisocyanate to form a temporary blocking of the polyisocyanate reactivity with water at temperatures at least below 212° F., and also to ensure the production of a resin that is chemically reactive as an adhesive component in a dip.

Those skilled in the art will recognize that it is critical that the RBP be unblocked at some temperature below that which is deleterious to the physical properties of the cord to which the adhesive is applied. As is also well known, the effectiveness of the isocyanate is assumed to derive from the reactivity of the isocyanate group with hydroxyls from the phenol, or the amide group of the lactams.

The acrylic resin may be a homopolymer of acrylic acid or of methacrylic acid which homopolymer provides COOH groups thought to be especially compatible with a polyester's COOH groups, and to slow down the cure of the adhesive coating on the cord. The acrylic resin may also be a homopolymer of an alpha-beta olefinically unsaturated carboxylic acid amide having a terminal $CH_2=C<$ group and having from 4 to 5 carbon atoms, such as poly[N-methylol (meth)acrylamide]; or, a copolymer of (meth)acrylic acid and N-methylol (meth)acrylamide; or, a copolymer of N-methylol (meth)acrylamide and a lower (meth)acrylic acid ester having from 4 to 5 carbon atoms; or more than two of the foregoing. Most preferred is an acrylic resin which is a carboxylic acid ester copolymer comprising a lower acrylic acid ester, a lower methacrylic acid ester, and, an alpha-beta olefinically unsaturated carboxylic acid amide having a terminal $CH_2=C<$ group and having from 4 to 5 carbon atoms.

The carboxylic acid ester copolymer is disclosed in the '887 patent and has been used for a variety of purposes such as in paper coating, textile printing, and baking enamels. This copolymer is made predominantly from acrylic or substituted acrylic esters such as ethyl acrylate, methyl methacrylate, or any of a number of homologous or analogous compounds such as methyl acrylate, propyl acrylate, butyl acrylate, ethyl methacrylate, butyl methacrylate, ethyl 2-chloroacrylate, ethyl 2-cyanoacrylate, or mixtures of such esters. The other essential ingredient of the copolymer is acrylic acid or a homologue such as methacrylic acid. Preferably an acrylic amide such as acrylamide or N-methylol acrylamide or homologues or analogues of them are also present, but generally used on a minor proportion in the copolymer, but sufficient to make it reactive toward other materials and preferably also heat-settable, generally not less than about 5% of the free acid and of the amide. Preferably, the N-methylol acrylamide is present in a quantity at least equivalent to the acrylic acid so as to assure essentially complete conversion of carboxyl groups to neutral or unreactive groups during the heat setting operation. If desired, small proportions of other copolymerizable monomers may be incorporated in the copolymer, such as vinyl acetate, styrene, or acrylonitrile.

Though the molecular weight (mol wt) of the particular acrylic resin chosen is not critical, the mol wt should not be so high that the resin is not substantially soluble in water. By "substantially soluble" I mean that the resin should be soluble in water in at least about 20 parts by wt per 100 parts of water, and most preferably, the resin should be completely soluble, that is, form a single phase. Preferred acrylic resins are those which have a mol wt in the range from about 3,000 to about 300,000, measured by standard gel permeation chromatographic (GPC) techniques, but most preferred are those in the range from about 10,000 to about 50,000 which include links of a (lower alkyl) acrylate such as methyl acrylate or ethyl acrylate.

The acrylic resin and lactam-blocked isocyanate admixed in the resorcinol-formaldehyde latex (R/F/L) composition is usually applied by dipping and squeezing to remove excess bath solution and evenly distributing the resorcinol-formaldehyde latex on the treated polyester surface. Padding or spraying or other techniques known in the art for applying a bath solution to fibres may also be employed. For tire and conveyor belt cords, the pick-up of admixture of RBP and R/F/L is preferably about 0.5 to 20% (solids), more preferably about 2 to 8% by weight.

The preferred type of resinous composition is that type made by reacting an aldehyde with resorcinol, or other polyhydric phenol which yields a resin which is substantially soluble in water. Suitable aldehydes that may be used, in addition to the preferred aldehyde formaldehyde, are acrolein, glyoxal, furfural, crontonaldehyde, aldol, hexamethoxymethylmelamine, and benzylaldehyde. Suitable polyhydric phenols which may be reacted with about an equimolar amount of one of the aforementioned aldehydes include, in addition to resorcinol, other difunctional compounds such as cresol, catechol, phloroglucinol, saligenin, dibeta naphthol, xylenol, 4,6-dimethyl-resorcinol, 2,5-dimethyl-resorcinol, hydroquinone, furfural alcohol, orcinol, pyrogallol, beta-naphthol, aminophenol, guaiacol, as well as urea and melamine.

Preferably the coated materials are then dried and the coating cured at about 150° C. to 250° C., and preferably about 175° C. to 230° C. for from 30 sec to 10 min, depending on the curing temperature, and preferably about 1 to 4 min. A curing temperature close to a softening temperature of the polyester material is preferred. An excessively high curing temperature can readily be detected by the fusing of fibres to produce stiff, relatively inflexible products. If desired, a second coating may be applied, although the solids content of the second coating bath is generally adjusted because the coated fibres do not, as a rule, pick up as much of the resorcinol formaldehyde latex solution as the uncoated fibres.

The dip compositions of this invention give equally good results when applied to the specified types of cords whether they are used in braided hose or helically reinforced hose or when applied to woven fabrics such as are used in certain types of belting and many other reinforced rubber products. The dip composition is typically applied to a cord by feeding it under tension through a dip bath, removing excess dip, passing the dip-coated cord through a drying zone at a temperature in the range from about 200° F. to about 350° F. to dry it under tension, and thereafter heating it further in what is normally referred to as a heat-setting temperature range from about 350° F. but below about 500° F. to complete the adhesion of the dip to the cord. Such treatment of cord may be done with individual cords or to woven fabrics. After the heat setting of the cords, they may be stored prior to being used.

The synthetic used in the following examples is the same as commercial material made from about 70% butadiene, 20% styrene, and 10% vinyl pyridine as the latex used in my '295 patent, for consistency. The R/F is a commercial partial reaction product of the two constituents supplied as a concentrated (75%) solution in water.

EXAMPLE 1

A cord dip composition is prepared containing the following ingredients, given as parts by weight, for a one-step dip:

|  | Total | Solids |
|---|---|---|
| Part A |  |  |
| Synthetic Latex 38% | 195 | 74 |
| Water | 75 |  |
| Part B |  |  |
| Resorcinol-formaldehyde | 13 | 10 |
| Ammonia 28% | 30 |  |
| Caustic soda (1.5% solids) | 15 | 0.23 |
| Acrylic resin (25% solids) | 45 | 11 |
| Part C |  |  |
| Formalin (37% solids) | 8 | 3 |
| Water | 15 |  |
| Part D |  |  |
| RBP(20% solids dispersion)* | 24.5 | 4.9 |

*caprolactam-blocked toluene diisocyanate (a) A mixture of parts A and B is first formed, and part C added to the mixture with thorough agitation. The mixture is allowed to stand (age) for from about 16 to about 24 hours and the RBP (part D) mixed into the aged mixture, again with thorough agitation, and agitation is maintained to keep the solids homogeneously dispersed. Since the RBP is normally solid, it has a proclivity to settle out in the one-step dip. To assist in keeping it dispersed, it is desirable to grind the RBP into particles smaller than about 25 microns, and preferably less than 15 microns with the majority of the particles being smaller than 2 microns. In addition, conventional dispersion agents and surfactants may be used as is commonly done in solids-containing baths to ensure as uniform a deposition of solids on the cord as possible.

(b) To compare the results obtained with a two-step process using the same ingredients, part D was held in a first continuously agitated bath in which cord is to be treated. A second agitated bath was used to hold a mixture of parts A and B into which part C was thoroughly mixed, and the mixture aged for the same amount of time as for the one-step bath in (a) above.

Tire cord made from two (2) T-811 AA polyethylene terephthalate yarns of 1000 denier each (referred to as "1000/2" cord), is dipped in the one-step dip formed by combining parts A-D, dried under tension at 250° F., and heat-set at about 400° F., is embedded in rubber and cured for H-pull tests.

The rubber stock is a conventional high-grade rubber stock such as is used on tires manufactured for original equipment on passenger automobiles, typically having the following composition:

| Ingredients | Parts (by wt) |
|---|---|
| Natural rubber | 100. |
| Zinc oxide | 3. |
| Carbon black | 30. |
| Stearic acid | 2. |
| Pine tar | 7.25 |
| Mercaptohiazole | 1.25 |
| Sulfur | 3. |
| Diphenylguanidine | 0.18 |
| Phenylbeta naphthylamine | 1. |

Adhesion between the cord and rubber was measured on a sample as prescribed in ASTM D-2138 H-pull test, the details of which are incorporated by reference thereto as if fully set forth herein.

Similarly, some of the same batch of 1000/2 T-811 AA polyester cord was treated in the two-step process, by first dipping the cord in part D, drying it at 250° F. under tension, heat-setting it at about 450° F. also under tension; then, dipping the RBP-coated cord in the second bath, removing excess dip, drying it at about 250° F., and heat-setting it at about 400° F., again under tension. The two-step treated cord is embedded in the same rubber stock as the one-step-treated cord, and cured identically as were the samples from the one-step process. The H-pull test results for the one-step and two-step processes are compared below:

|  | Average of 5 tests |
|---|---|
| Two-step process | 37 lb |
| One-step process | 37 lb |

Results obtained with aramid cords commercially available under the designation Kevlar ®1500/2 showed that the pull-out forces for one-step and two-step treated cords each having the same ingredients, particularly the acrylic resin of the '887 Essig patent, were essentially the same.

EXAMPLE 2

A one-step dip was prepared in the same manner, and with the same ingredients as those set forth hereinabove in Example 1(a), except that the acrylic resin was omitted. As before, 1000/2 T-811 AA polyester cord was pretreated in this bath under the same conditions set forth in example 1 hereinabove, embedded in rubber and cured identically as before. In the following data, the one-step bath with the acrylic resin omitted, is designated Bath A; the one-step bath with the acrylic resin is the same as that in example 1(a) hereinabove, and is designated Bath B.

|  | Average of 5 tests |
|---|---|
| Bath A | 25 lb |
| Bath B | 32 lb |

The foregoing tests were repeated with baths containing various concentration of RBP and acrylic resin in relation to the amount by wt of R/F solids (excluding solids from the latex).

The ratios of RF:acrylic resin were varied keeping the amount of RBP constant, and it was found that adhesion was adversely affected (the H-pull tests showed unacceptably poor results) when the ratio of RF:acrylic resin was substantially outside the range from about 0.5:1.0 to about 5:1. The most preferred ratio of RF:acrylic resin is about 2:1.

Similarly, the ratios of RF:RBP was varied keeping the amount of acrylic resin constant, and it was found that unacceptably poor H-pull test results were obtained when the ratio of RF:RBP was substantially outside the range of from about 9:1, to about 1:3. The most preferred ratio of RF:RBP is about 2:1.

Clearly there is a synergistic result attributable to the presence of both the acrylic resin and the RBP in the one-step dip.

Comparable results were obtained with aramid cords.

EXAMPLE 3

Steel belted automobile tires having a 'radial' construction in sizes P205/75R14 and P185/80R13 were made as described in U.S. Pat. No. 4,281,703 for experimental tests from fabric of 1000/2 T-811 AA polyester cords pretreated in two steps, first in a bath (Bath C) containing a 20% solids dispersion of a caprolactam-blocked toluenediisocyanate, and then, in a second bath (Bath D) containing a commercially available R/F/L in which is dissolved an acrylic resin such as one of the Carboset ® resins available from The B. F. Goodrich Company.

The fabric is passed through the first bath C at a rate in the range from about 120 ft/min to about 300 ft/min, dried at a temperature of 300° F. for 2 min, and followed by heat-setting the RBP at 450° F., under tension. The RBP-coated fabric from bath C is then passed through second bath D, dried at 300° F. for 2 min and heat-set at 450° F. for 40 secs, also under tension, so as to coat the fabric with 6.5% by wt of solids.

In an analogous manner, some of the same batch of fabric used in the two-step process, was coated in a one-step bath (Bath E) in which all the ingredients used in the two baths C and D were combined. As before, the fabric was passed through the bath E under tension at a rate of about 120–300 ft/min so as to coat it with 6.5% by wt of solids, after it is dried at 300° F. for 2 min and heat-set at 450° F. for 40 sec. The ingredients for bath E are listed herebelow:

| Bath E | Dry | Wet |
|---|---|---|
| Resorcinol | 11 | 11 |
| Formaldehyde (37%) | 6 | 16.2 |
| Sodium hydroxide | 0.3 | 0.3 |
| Water | — | 298.5 |
| Butadiene/styrene/vinyl pyridine latex (41% solids) | 100 | 244 |
| Ammonium hydroxide (28%) | — | 11.3 |
| RBP(20% solids) | 6.9 | 34.5 |
| Acrylic resin (25%) | 15. | 60. |

The pH of the bath is preferably in the range from about 9 to about 12, and most preferably between 10 and 11. The pH is adjusted to fall within this range by addition of NH$_4$OH.

Sets of tires in the P205/75R14 size were made with a 2-ply construction, while the P185/80R13 were made with a mon-ply construction. Each set was tested to destruction in the following DOT tests, the results of which are set forth below:

| Tire | Cord Dip | DOT 305* High Speed | DOT 4158* Endurance |
|---|---|---|---|
| P205/75R14 (2 ply const) | 2-step (control) | 515 miles | 9300 miles |
| | 1-step (this invention) | 527 miles | 11,700 miles |
| P185/80R13 (1 ply const) | 2-step (control) | 450 miles | 3460 miles |
| | 1-step (this invention) | 440 miles | 4180 miles |

*Average of three (3) tires

From the foregoing data it is evident that there is substantially no difference in high speed test results, and that the endurance of the tires made with fabric pretreated with a one-step dip containing the RBP and the acrylic resin is slightly better than that of the tires made in a two-step process with the RBP coated first, and the R/F/L containing acrylic resin coated next.

To test the results with non-adhesive activated polyester cord, fabric made from 1000/2 T-800 cord was treated in a one-step bath (Bath E) and the dipped cord, dried and heat-set at substantially identical conditions as those for the pretreatment of T-811 AA polyester cord. The fabric was then used to construct a set of P205/75R14 tires with a 2-ply construction, using as nearly identical tire-construction techniques as is practically possible. The tires were tested to destruction using the same DOT tests as those listed above, and the results are set forth below:

| Tire | Cord Dip | DOT 305* High Speed | DOT 4158* Endurance |
|---|---|---|---|
| P205/75R14 (2 ply const) | 1-step T-800 non-AA | 358 miles | 5280 miles |

*Average of three (3) tires

From the foregoing tests it is evident that non-AA polyester cord treated identically as the AA cord in a one-step dip of this invention, has tires with test results inferior to those obtained with tires made from AA cord.

I claim:

1. A one-step dip for coating a cord or fabric made from adhesive-activated polyester, or aramid, comprising, an aqueous dispersion containing
(a) an adhesive latex of a diene polymer,
(b) an acrylic resin selected from the group consisting of poly[(meth)acrylic acids], poly[N-methylol (meth)acrylamides], and a copolymer of one or more monomers of the foregoing homopolymers with a lower (meth)acrylic acid ester, having the structure

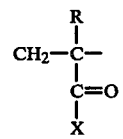

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms, and,
(c) a reversibly blocked polyisocyanate formed by reversibly blocking a polyisocyanate with a blocking agent capable of an addition reaction with it, wherein resorcinol formaldehyde solids in said adhesive latex and said acrylic resin are present in a ratio in the range from about 0.5:1 to about 5:1, and the ratio of resorcinol formaldehyde solids to reversibly blocked polyisocyanate is in the range from about 9:1 to about 1:3.

2. The one-step dip of claim 1 wherein, said latex is in substantial part a dispersion of a polymer made predominantly from butadiene and to a minor extent, from styrene and vinyl pyridine, said acrylic resin is at least partially soluble in water, said resin having a molecular weight in the range from about 3,000 to about 300,000, and, said reversibly blocked polyisocyanate is an aromatic polyisocyanate which is unblocked at a temperature above about 300° F. but below that which is deleterious to the tensile stength of said cord or fabric.

3. The one-step dip of claim 2 wherein said acrylic resin is selected from the group consisting of a a homopolymer selected from the group consisting of polyacrylic acid, polymethacrylic acid, poly(N-methylol acrylamide), poly(N-methylol methacrylamide), and a copolymer made from methyl methacrylate, acrylic or methacrylic acid, and N-methylol acrylamide.

4. The one-step dip of claim 2 wherein said blocking agent is a phenol or amide.

5. The one-step dip of claim 3 wherein said acrylic resin is a copolymer made predominantly from methyl methacrylate, to a minor extent from acrylic or methacrylic acid, and to an extent at least equivalent to that of the acid, from N-methylol acrylamide.

6. The one-step dip of claim 4 wherein, said aromatic polyisocyanate is selected from the group consisting of triphenyl methane-triisocyanate, 2,4-toluene-diisocyanate, and methylene-bis-(4-phenylisocyanate, said phenol blocking agent is a monohydroxy benzene selected from the group consisting of o-chlorophenol, p-chlorophenol, o-bromophenol, p-bromophenol, o-cresol, p-cresol, 3,4-dichlorophenol, p-tertiary butyl phenol, and 2,5-dimethyl phenol, and, said amide is a lactam selected from the group consisting of 2-pyrrolidone, 2-piperidone, and caprolactam.

7. A one-step process for dipping cord or fabric to coat it with an adhesive from a bath prior to drying and heat-setting the adhesive, comprising, (a) a one-step process for dipping the cord or fabric made from adhesive-activated polyester or aramid in said bath comprising an aqueous dispersion containing an adhesive latex of a diene polymer, an acrylic resin selected from the group consisting of poly[(meth)acrylic acids], poly[N-methylol (meth)acrylamides], and a copolymer of one or more monomers of the foregoing homopolymers with a lower (meth)acrylic acid ester, having the structure

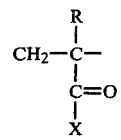

wherein, R represents H, methyl, ethyl, Cl or CN, and, X represents hydroxyl (OH), hydroxymethylamino (NHCH$_2$OH), or alkoxy (O-alkyl) having from 1 to 4 carbon atoms, and, a reversibly blocked polyisocyanate formed by reversibly blocking a polyisocyanate with a blocking agent capable of an addition reaction with said polyisocyanate, wherein resorcinol formaldehyde solids in said adhesive latex and said acrylic resin are present in a ratio in the range from about 0.5:1 to about 5:1, and the ratio of resorcinol formaldehyde solids to reversibly blocked polyisocyanate is in the range from about 9:1 to about 1:3, (b) drying the cord at a temperature in the range from about 200° F. to about 350° F. under tension, and thereafter (c) heat-setting the coated cord or fabric at a temperature in the range from about 350° F. but below that which is deleterious to the tensile strength of the cord or fabric.

8. The one-step process of claim 7 wherein, said latex is in substantial part a dispersion of a polymer made predominantly from butadiene and to a minor extent, from styrene and vinyl pyridine, said acrylic resin is at least partially soluble in water, said resin having a molecular weight in the range from about 3,000 to about 300,000, and, said reversibly blocked polyisocyanate is an aromatic polyisocyanate which is unblocked at a temperature above about 300° F. but below that which is deleterious to the tensile strength of said cord or fabric.

9. The one-step process of claim 7 wherein said acrylic resin is selected from the group consisting of a a homopolymer selected from the group consisting of polyacrylic acid, polymethacrylic acid, poly(N-methylol acrylamide), poly(N-methylol methacrylamide), and a copolymer made from methyl methacrylate, acrylic or methacrylic acid, and N-methylol acrylamide.

10. The one-step process of claim 9 wherein said blocking agent is a phenol or amide.

11. The one-step process of claim 9 wherein said acrylic resin is a copolymer made predominantly from methyl methacrylate, to a minor extent from acrylic or methacrylic acid, and to an extent at least equivalent to that of the acid, from N-methylol acrylamide.

12. The one-step process of claim 10 wherein, said aromatic polyisocyanate is selected from the group consisting of triphenyl methane-triisocyanate, 2,4-toluene-diisocyanate, and methylene-bis-(4-phenylisocyanate), said phenol blocking agent is a monohydroxy benzene selected from the group consisting of o-chlorophenol, p-chlorophenol, o-bromophenol, p-bromophenol, o-cresol, p-cresol, 3,4-dichlorophenol, p-tertiary butyl phenol, and 2,5-dimethyl phenol, and, said amide is a lactam selected from the group consisting of 2-pyrrolidone, 2-piperidone, and caprolactam.

13. The process of claim 11 wherein the pick-up of resorcinol formaldehyde latex together with reversibly blocked polyisocyanate is in the range from about 0.5 to about 20% by weight on a solids basis.

* * * * *